US011575814B2

(12) United States Patent
Liu

(10) Patent No.: US 11,575,814 B2
(45) Date of Patent: Feb. 7, 2023

(54) IMAGE CAPTURING DEVICE AND APPEARANCE INSPECTING DEVICE INCLUDING THE SAME

(71) Applicant: ASUSTeK COMPUTER INC., Taipei (TW)

(72) Inventor: Kuan-Lin Liu, Taipei (TW)

(73) Assignee: ASUSTEK COMPUTER INC., Taipei (TW)

(*) Notice: Subject to any disclaimer, the term of this patent is extended or adjusted under 35 U.S.C. 154(b) by 0 days.

(21) Appl. No.: 17/074,694

(22) Filed: Oct. 20, 2020

(65) Prior Publication Data
US 2021/0136266 A1 May 6, 2021

(30) Foreign Application Priority Data
Nov. 5, 2019 (TW) ................................ 108140159

(51) Int. Cl.
H04N 5/225 (2006.01)

(52) U.S. Cl.
CPC ......... H04N 5/2256 (2013.01); H04N 5/2251 (2013.01)

(58) Field of Classification Search
CPC . H04N 5/2256; H04N 5/2251; G01N 21/8806
USPC ......................................................... 348/371
See application file for complete search history.

(56) References Cited

U.S. PATENT DOCUMENTS

| 7,889,251 | B1* | 2/2011 | Ng ........................ H04N 17/002 348/222.1 |
| 8,363,157 | B1* | 1/2013 | Han ....................... H04N 5/2256 348/370 |
| 9,036,943 | B1 | 5/2015 | Baldwin |
| 9,632,036 | B2 | 4/2017 | Sun |
| 2007/0176927 | A1 | 8/2007 | Kato et al. |
| 2007/0205357 | A1* | 9/2007 | Tanaka .................. H04N 5/2254 348/E5.025 |
| 2007/0229810 | A1 | 10/2007 | Kaya |
| 2008/0205357 | A1* | 8/2008 | Pandey ............... H04W 84/005 370/338 |
| 2016/0103079 | A1* | 4/2016 | Moroli ............... G01N 21/8806 356/237.2 |
| 2018/0343438 | A1* | 11/2018 | Cho ..................... H04N 13/254 |
| 2018/0367762 | A1 | 12/2018 | Shahar et al. |
| 2019/0213748 | A1* | 7/2019 | Kato ................. G01N 21/95684 |
| 2020/0053269 | A1* | 2/2020 | Dorai ..................... H05B 45/39 |
| 2021/0096689 | A1* | 4/2021 | Otani ................... H04N 9/3179 |

FOREIGN PATENT DOCUMENTS

| JP | 2007206797 A | 8/2007 |
| JP | 2007278713 | * 10/2007 ............. G01N 21/84 |
| JP | 2007278713 A | 10/2007 |

(Continued)

Primary Examiner — Lin Ye
Assistant Examiner — Chan T Nguyen
(74) Attorney, Agent, or Firm — McClure, Qualey & Rodack, LLP

(57) ABSTRACT

An image capturing device is provided, which includes an image capture component and N light modules. The image capture component is configured to capture an appearance image of a component. The N light modules are disposed around the image capture component, to be turned on alternately, and N≥4. When at least one of the N light modules is turned on, the image capture component captures the appearance image of the component.

3 Claims, 5 Drawing Sheets

(56) References Cited

FOREIGN PATENT DOCUMENTS

| | | | | |
|---|---|---|---|---|
| JP | 2007206797 | A | 12/2007 | |
| JP | 2007335991 | * | 12/2007 | ............. H04N 5/335 |
| JP | 2010181951 | * | 8/2010 | ............... H04N 1/40 |
| JP | 2010181951 | A | 8/2010 | |
| JP | 2018112478 | * | 7/2018 | ............. G01N 21/88 |
| JP | 2018112478 | A | 7/2018 | |

* cited by examiner

IMAGE CAPTURING DEVICE AND APPEARANCE INSPECTING DEVICE INCLUDING THE SAME

CROSS-REFERENCE TO RELATED APPLICATION

This application claims the priority benefit of Taiwan applications serial No. 108140159, filed on Nov. 5, 2019. The entirety of the above-mentioned patent application is hereby incorporated by reference and made a part of specification.

BACKGROUND OF THE INVENTION

Field of the Invention

The invention relates to an image capturing device.

Description of the Related Art

When a product is performed an appearance defect detection, the reflective problem of the captured image of the product is occurred with reflective materials, and therefore the appearance details of the product is hard to be seen by the captured image. In addition, some appearance defects need to be inspected at various reflection angles, which means a lot of manual time is required for angles adjustment repeatedly to do the inspections, and is very time-consuming, labor-intensive, and the detection efficiency is not improved.

BRIEF SUMMARY OF THE INVENTION

According to the first aspect, an image capturing device is provided. The image capturing device includes an image capture component and N light modules. The image capture component is configured to capture an appearance image of a component. The N light modules are disposed around the image capture component, to be turned on alternately, and $N \geq 4$. When at least one of the N light modules is turned on, the image capture component captures the appearance image of the component.

According to the second aspect, an appearance inspecting device is provided. The appearance inspecting device includes at least two image capturing devices arranged side by side in one direction. Each of the image capturing devices includes an image capture component and N light modules. The image capture component is configured to capture an appearance image of a component. The N light modules are disposed around the image capture component, to be turned on alternately, and $N \geq 4$. When at least one of the N light modules is turned on, the image capture component captures the appearance image of the component.

In summary, the image capturing device and the appearance inspecting device including the same disclosed in this disclosure include a plurality of light modules and at least one image capturing element and provide a complete appearance image by alternately turning on a plurality of light modules and controlling the image capturing element to capture a plurality of appearance images. The image capturing device disclosed herein provides complete appearance images automatically, thus increases the efficiency of defect detection.

These and other features, aspects and advantages of the present invention will become better understood with regard to the following description, appended claims, and accompanying drawings.

DETAILED DESCRIPTION OF THE EMBODIMENTS

Figure 1:
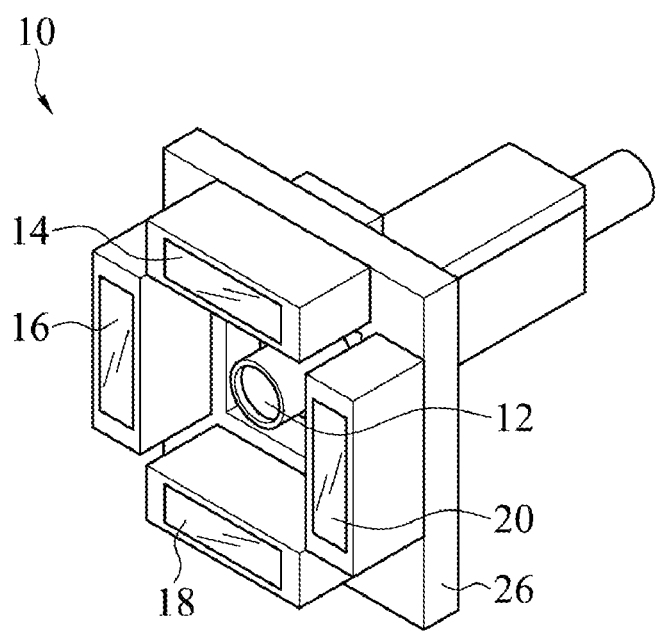
FIG. 1 is a three-dimensional schematic diagram of an image capturing device of an embodiment.
Figure 4:
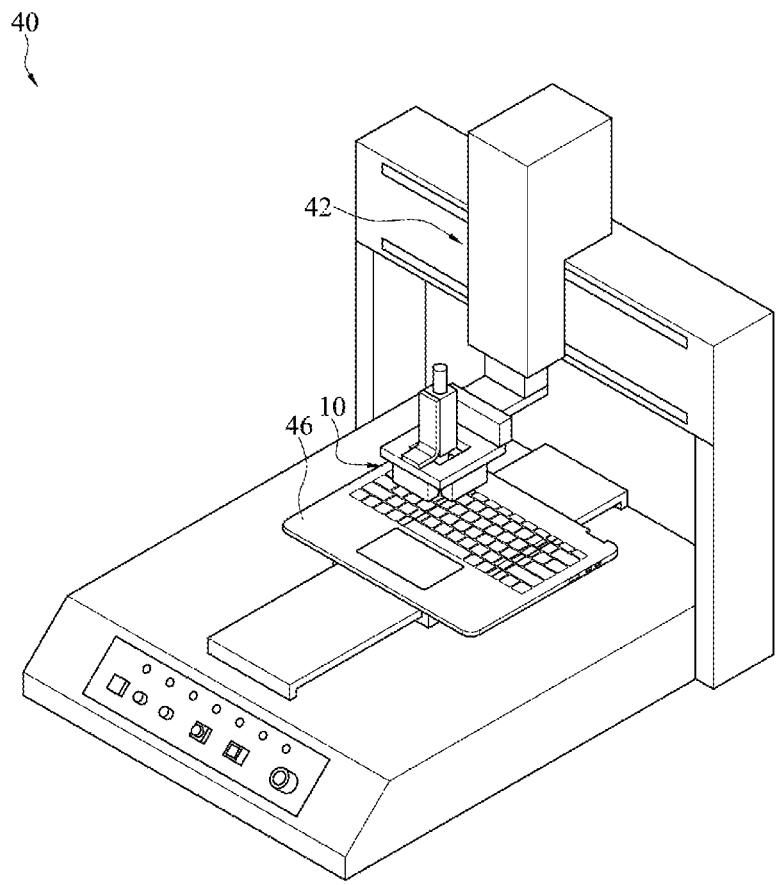
FIG. 4 is a schematic structural view of an appearance inspecting device during detection according to an embodiment.

Please refer to FIG. 1. An image capturing device 10 includes an image capture component 12 and N light modules, wherein $N \geq 4$ and is an even number. In this embodiment, N is equal to 4, that is, the four light modules 14, 16, 18, and 20 are provided in the embodiment, which is not limited herein. In an embodiment, the image capture component 12 captures the appearance image of a component. The light modules 14, 16, 18, and 20 are arranged around the periphery of the image capture component 12 in a rectangle. Each of the light modules 14, 16, 18, 20 produces a uniform light source. When at least one of the light modules 14, 16, 18, 20 is turned on, the image capture component 12 captures the appearance image of the component 46 (as shown in FIG. 4). In one embodiment, the image capture component 12 cooperates with the light modules 14, 16, 18, and 20, to capture the appearance image of the testing area of the component when the light modules 14, 16, 18, and 20 are turned on alternately. In one embodiment, the image capturing device 10 further includes a flat carrying plate 26, and the image capture component 12 and the light modules 14, 16, 18, and 20 around the image capture component 12 are all disposed on the surface of the flat carrying plate 26. The height of the light modules 14, 16, 18 and 20 extending from the flat carrying plate 26 are the same.

In one embodiment, the image capture component 12 is a camera or a video camera. The light modules 14, 16, 18, 20 include multiple light emitting diodes (LEDs) or light tubes.

Figure 2:
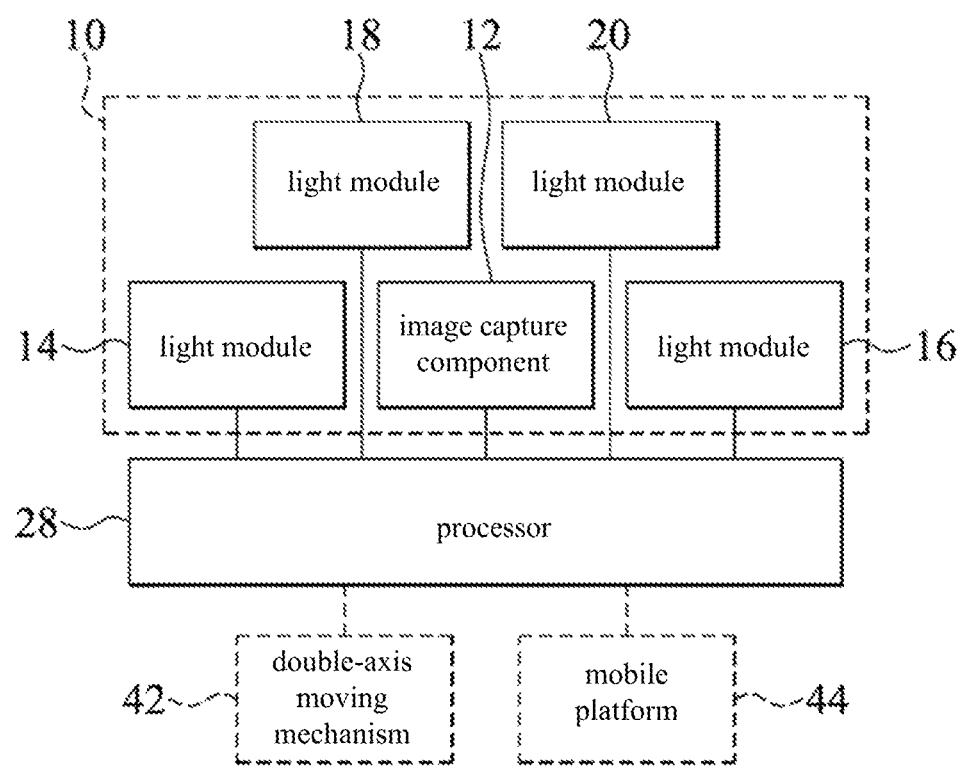
FIG. 2 is a schematic circuit diagram of an appearance inspecting device of an embodiment.
Figure 3:
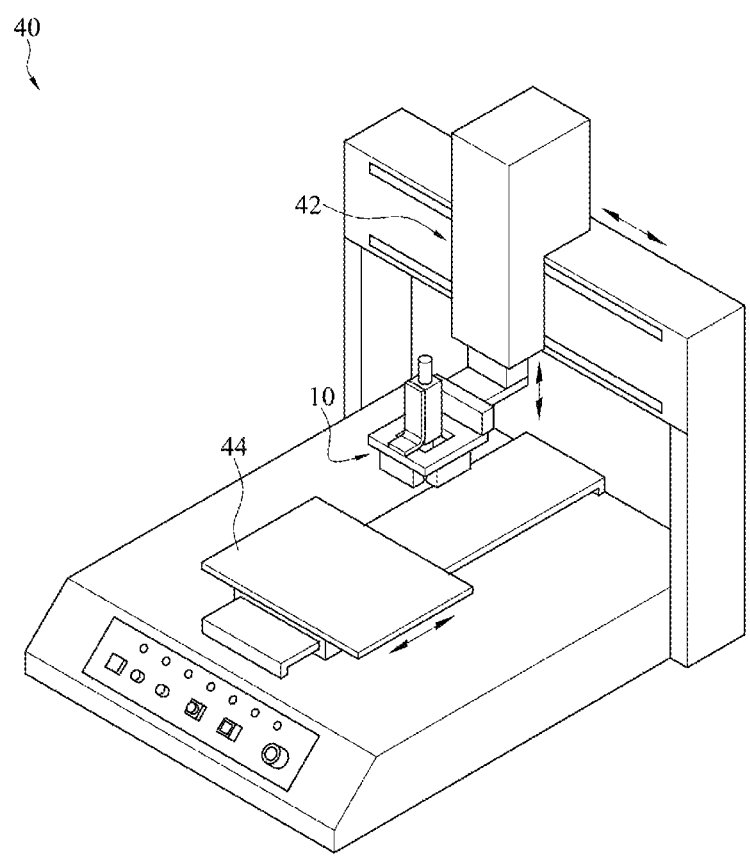
FIG. 3 is a schematic structural view of an appearance inspecting device having an image capturing device according to an embodiment.

Please refer to FIG. 1 and FIG. 2. The image capture component 12 and the light modules 14, 16, 18, 20 are electrically connected to a processor 28. In an embodiment, the processor 28 controls the light modules 14, 16, 18, 20 to be turned on alternately and controls the image capture component 12 to capture the appearance image of the component respectively when the light modules 14, 16, 18, and 20 are turned on alternately.

In one embodiment, the processor 28 is a system on chip (SoC), a microcontroller (MCU), a central the processor (CPU), or a special application integrated circuit (ASIC). In one embodiment, the processor 28 is a processor of a desktop, a laptop, a tablet, or a smartphone.

Please refer to FIG. 1 to FIG. 4. The appearance inspecting device 40 includes the image capturing device 10, a double-axis moving mechanism 42 and a mobile platform 44. The processor 28 is electrically connected to the double-axis moving mechanism 42 and the mobile platform 44, to control the double-axis moving mechanism 42 and the mobile platform 44, respectively. The image capturing device 10 is disposed on the double-axis moving mechanism 42, and the double-axis moving mechanism 42 drives the image capturing device 10 to move left and right in a first direction (such as the X-axis direction) and to move up and down in a second direction (such as the Z-axis direction). When the double-axis moving mechanism 42 drives the image capturing device 10 to move up and down in the Z-axis direction, the range of the component 46 covered by the light emitted from the light modules 14, 16, 18, 20 is adjustable by moving the image capturing device 10 up and down. The mobile platform 44 is disposed under the image capturing device 10. In an embodiment, a component 46 is placed on the mobile platform 44, and the mobile platform 44 drives the component 46 to move back and forth in a third direction (such as the Y-axis direction). In this way, through the cooperation of the double-axis moving mechanism 42 and the mobile platform 44, three-axis relative movement is performed to locate the image capturing device 10 above the component 46 for capturing image.

Please refer to FIG. 1 to FIG. 4. When the double-axis moving mechanism 42 drives the image capturing device 10 and the mobile platform 44 drives the component 46 to move to a testing position, the image capturing device 10 is located above the testing area of the component 46. Then, the processor 28 controls the light modules 14, 16, 18, 20 to be turned on alternately and controls the image capture component 12 to respectively capture the appearance image of the testing area of the component when the light modules 14, 16, 18, and 20 are turned on alternately. In detail, the image capture component 12 captures the first appearance image when the processor 28 controls the light module 14 to illuminate the component 46. The image capture component 12 captures the second appearance image when the processor 28 controls the light module 16 to illuminate the component 46. The image capture component 12 captures the third appearance image when the processor 28 controls the light module 18 to illuminate the component 46. The image capture component 12 captures the fourth appearance image when the processor 28 controls the light module 20 to illuminate the component 46. When there are N light modules, the image capture component 12 captures at least N appearance images at the same position of the component 46, and N is equal to 4 in this embodiment.

When capturing at least N pieces of the appearance image (that is, the first appearance image to the fourth appearance image), the processor 28 obtains at least N pixels corresponding to each pixel position from at least N pieces of the appearance image. In other words, the processor 28 respectively obtains a pixel at the same pixel position of the first appearance image to the fourth appearance image. As there are four appearance images, there are four pixels in the same pixel position. Then, the processor 28 obtains the best pixel color of each pixel position according to the at least N pixels and a calculation program to generate a final image. In the calculation program, the processor 28 first sorts the four pixels according to the brightness of the four pixels (such as from the brightest pixel to the darkest pixel), discards the darkest and brightest pixels, and takes the average of the colors (RGB) of the pixels with intermediate brightness as the best pixel color of the corresponding pixel position.

Since the best pixel colors of all the pixel positions are obtained, a clear final image is also obtained. In this embodiment, since the final image is composed of the best pixel colors obtained from the four appearance images, the final image is actually a clear image. When there is a defect on the component 46, the defect is clearly shown on the final image, so the appearance defect detection is completed based on the final image by the computer (the processor).

In an embodiment, the processor 28 selectively controls the light modules 14, 16, 18, 20 to emit light alternately. One or more of the light modules 14, 16, 18, 20 is selectively turned on alternately at each time, which is determined according to the actual testing needs.

Figure 5:
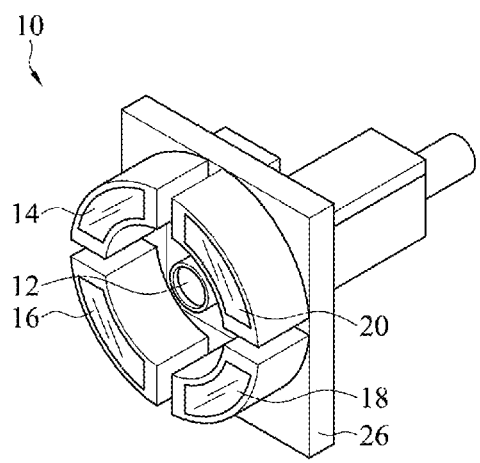
FIG. 5 is a three-dimensional schematic diagram of an image capturing device of an embodiment.

In another embodiment, the light modules 14, 16, 18, 20 of the image capturing device 10 is arranged in a circle. Please refer to FIG. 5. The light modules 14, 16, 18, 20 are located on the flat carrying plate 26 around the image capture component 12. Each of the light modules 14, 16, 18, 20 is a circular arc, so that the light modules 14, 16, 18, 20 are arranged in a circle. The image capture component 12 captures the appearance image of the testing area of the component respectively when the light modules 14, 16, 18, 20 are turned on alternately. The detailed operation is the same as the previous embodiment, and will not be repeated here.

Figure 6:
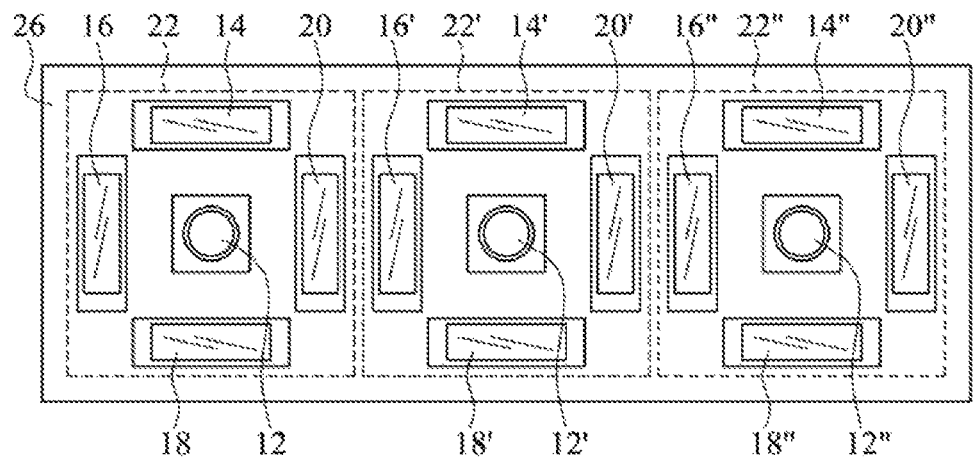
FIG. 6 is a partial structural diagram of an appearance inspecting device of an embodiment.

In one embodiment, the appearance inspecting device further includes at least two image capturing devices, and at least two image capturing devices are arranged side by side on the carrying plate in one direction. Please refer to FIG. 4 and FIG. 6. In an embodiment, the three image capturing devices 22, 22', 22" obtain the appearance image of different testing areas on the same component 46 respectively. Furthermore, the processor 28 also selectively controls the image capturing devices 22, 22', 22" to turn on the light modules on the same side simultaneously (for example: the processor 28 simultaneously lights the light modules 14, 14', 14" or lights the light modules 18, 18', 18"), to improve the detection efficiency. Three groups of the image capturing device 22, 22', 22" are arranged on the flat carrying plate 26 side by side along one direction. The image capturing device 22 includes an image capture component 12 and light modules 14, 16, 18, 20 around, and the light modules 14, 16, 18, 20 that arranged in a rectangle. The image capturing device 22' includes an image capture component 12' and light modules 14', 16', 18', 20' around the image capture component 12', and the light modules 14', 16', 18', 20' is arranged in a rectangle. The image capturing device 22" includes an image capture component 12" and light modules 14", 16", 18", 20" around the image capture component 12", and the light modules 14", 16", 18", 20" are arranged in rectangle. In one embodiment, the processor 28 controls the light modules 14, 14', 14" to simultaneously illuminate the component 46, at this time, the image capture components 12, 12', 12" respectively captures appearance images. Then, the processor 28 controls the light modules 18, 18', 18" to simultaneously illuminate the component 46, at this time, the image capture components 12, 12', 12" respectively captures appearance images. After that, the processor 28 controls the light modules 16, 20" to simultaneously illuminate the component 46, at this time, the image capture component 12, 12" respectively captures an appearance image. Then, the processor 28 controls the light module 20 to illuminate the component 46 and controls the image capture component 12 to capture an appearance image. After that, the light module 16' illuminates the component 46 and the image capture component 12' captures an appearance image. Then, the processor 28 controls the light module 20"

to illuminate the component 46 and controls the image capture component 12' to capture an appearance image. Finally, the processor 28 controls the light module 16" to illuminate the component 46 and controls the image capture component 12" to capture an appearance image. In this way, each of the image capture components 12, 12', 12" captures four pieces of the appearance image. After the processor 28 calculates and analyzes the four pieces of the appearance image captured by each of the image capture components 12, 12' and 12", three final images of different testing areas of the component 46 are obtained.

Figure 7:
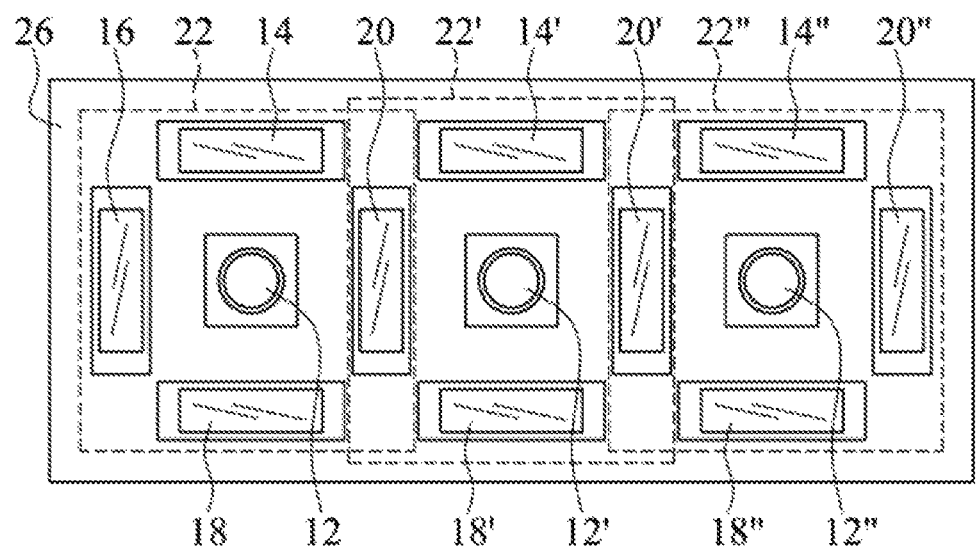
FIG. 7 is a partial structural diagram of an appearance inspecting device of an embodiment.

In one embodiment, in order to save space and the number of the light modules, any two adjacent image capturing devices of the image capturing devices 22, 22', 22" share the same light module at the adjacent edge therebetween. Please refer to FIG. 7. Three image capturing devices 22, 22', 22" are disposed side by side on the flat carrying plate 26 in a direction. The image capturing device 22 includes the image capture component 12 and the light modules 14, 16, 18, 20 disposed around the image capture component 12, and the light modules 14, 16, 18, 20 arranged in a rectangle. The image capturing device 22' and the image capturing device 22 share the same light module 20 located at the adjacent side therebetween. The image capturing device 22' includes the image capture component 12' and the light modules 14', 20, 18', and 20' around the image capture component 12' and arranged in a rectangle. The image capturing device 22' and the adjacent image capturing device 22" share the light module 20' located at the adjacent side therebetween. The image capturing device 22" includes the image capture component 12" and the light modules 14", 20', 18", 20" around the image capture component 12" and arranged in a rectangle. Then, the processor 28 controls each of the image capture components 12, 12', 12" of the image capturing devices 22, 22', 22" to capture images and performs subsequent operations. The detailed operation is the same as the aforementioned FIG. 6 embodiment, and will not be repeated here.

In an embodiment, the number of the image capturing device is equal to or more than two, the number of the image capturing devices is selected according to the size of the component to be tested, and at least two of the image capturing devices of the appearance inspecting device are disposed on the double-axis moving mechanism longitudinally or laterally.

In sum, the image capturing device and the appearance inspecting device including the same disclosed in this disclosure include a plurality of light modules and at least one image capturing element and provide a complete appearance image by alternately turning on a plurality of light modules and controlling the image capturing element to capture a plurality of appearance images. The image capturing device disclosed herein provides complete appearance images automatically, thus increases the efficiency of defect detection.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. An appearance inspecting device, comprising:
    a flat carrying plate;
    at least two image capturing devices, located on the flat carrying plate and arranged side by side in one direction, each of the at least two image capturing devices comprises:
 an image capture component, located on the flat carrying plate and configured to capture an appearance image of a component; and
    N light modules, located on the flat carrying plate and disposed around the image capture component, to be turned on alternately lit, and N≥4, wherein the image capture component captures the appearance image of the component when at least one of the N light modules is lit, and the heights of the light modules extending from the flat carrying plate are the same, wherein any two adjacent image capturing devices of the image capturing devices share the same light module disposed at the adjacent edge between the two adjacent image capturing devices,
    wherein the image capture component of each one of the image capturing devices and the N light modules are electrically connected to a processor, the processor controls the N light modules to be turned on alternately and controls the image capture component to capture the appearance image, the image capturing devices is configured to face a plurality of testing areas of the component respectively, the image capture component of each one of the image capturing devices captures at least N appearance images of the testing area respectively, the processor obtains at least N pixels corresponding to each pixel position from the at least N appearance images, and calculates the best pixel color of each pixel position according to the at least N pixels corresponding to each pixel positions and a calculation program, to generate a final image, and the steps of the calculation program comprises: sorting the at least N pixels corresponding to each pixel position according to the brightness, discarding the darkest and brightest pixels, and taking the average of the colors of the pixels with intermediate brightness as the best pixel color of each pixel position,
    wherein the processor controls the image capturing devices to simultaneously illuminate the light modules at the same side, and controls the image capture components of the image capturing devices to capture the appearance image at the same time respectively.

2. The appearance inspecting device according to claim 1, N is an even number.

3. The appearance inspecting device according to claim 1, the N light modules are arranged in a rectangle or circle.

* * * * *